(12) United States Patent
Savard et al.

(10) Patent No.: US 11,959,390 B2
(45) Date of Patent: Apr. 16, 2024

(54) GAS TURBINE ENGINE EXHAUST CASE WITH BLADE SHROUD AND STIFFENERS

(71) Applicant: Pratt & Whitney Canada Corp., Longueuil (CA)

(72) Inventors: Philippe Savard, Terrebonne (CA); Guy Lefebvre, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 64 days.

(21) Appl. No.: 17/884,201

(22) Filed: Aug. 9, 2022

(65) Prior Publication Data

US 2024/0052758 A1 Feb. 15, 2024

(51) Int. Cl.
*F01D 25/24* (2006.01)
*F01D 9/04* (2006.01)

(52) U.S. Cl.
CPC ............ *F01D 25/24* (2013.01); *F01D 9/041* (2013.01); *F05D 2240/14* (2013.01)

(58) Field of Classification Search
CPC ........ F01D 25/24; F01D 25/243; F01D 25/28; F01D 25/30; F01D 25/162; F01D 9/041; F05D 2240/14; F05D 2240/90; F05D 2260/30; F02K 1/04
See application file for complete search history.

(56) References Cited

U.S. PATENT DOCUMENTS

| | | | |
|---|---|---|---|
| 5,203,674 A | 4/1993 | Costantino | |
| 7,793,488 B2 * | 9/2010 | Eleftheriou | F02K 3/06 415/213.1 |
| 8,245,518 B2 * | 8/2012 | Durocher | F01D 25/162 415/142 |
| 8,945,325 B2 * | 2/2015 | Everhart | B29C 53/587 244/119 |
| 8,985,942 B2 | 3/2015 | Daniels | |
| 10,746,056 B2 | 8/2020 | Debray | |
| 11,060,418 B2 | 7/2021 | Debray | |
| 2009/0053046 A1 | 2/2009 | Black | |

(Continued)

FOREIGN PATENT DOCUMENTS

| | | |
|---|---|---|
| CN | 207526535 U | 6/2018 |
| GB | 2074244 A | 10/1981 |
| JP | 2014156813 A | 8/2014 |

OTHER PUBLICATIONS

EP Search Report for EP Patent Application No. 23190544.9 dated Sep. 29, 2023.

*Primary Examiner* — Igor Kershteyn
(74) *Attorney, Agent, or Firm* — Getz Balich LLC

(57) ABSTRACT

An assembly is provided for a gas turbine engine. This engine assembly includes a bladed rotor rotatable about an axis, and an engine case. The engine case includes an outer duct wall, a first circumferential stiffener, a second circumferential stiffener and a plurality of axial stiffeners. The outer duct wall forms a shroud around the bladed rotor. The first circumferential stiffener extends circumferentially about the outer duct wall. The second circumferential stiffener extends circumferentially about the outer duct wall. The axial stiffeners are arranged circumferentially about the outer duct wall. Each of the axial stiffeners extends axially between the first circumferential stiffener and the second circumferential stiffener.

20 Claims, 8 Drawing Sheets

(56) References Cited

U.S. PATENT DOCUMENTS

| | | |
|---|---|---|
| 2009/0220337 A1 | 9/2009 | Kawakami |
| 2010/0242494 A1 | 9/2010 | Mulcaire |
| 2011/0262277 A1* | 10/2011 | Sjoqvist ............... F01D 25/162 |
| | | 416/213 R |
| 2012/0102956 A1 | 5/2012 | Nanda |
| 2015/0034412 A1 | 2/2015 | Mecuson |
| 2016/0200443 A1* | 7/2016 | Bellabal ................... F02K 3/06 |
| | | 415/213.1 |
| 2017/0234157 A1 | 8/2017 | Khan |
| 2020/0308983 A1 | 10/2020 | Lefebvre |
| 2021/0156257 A1 | 5/2021 | Pankaj |

* cited by examiner

GAS TURBINE ENGINE EXHAUST CASE WITH BLADE SHROUD AND STIFFENERS

TECHNICAL FIELD

This disclosure relates generally to a gas turbine engine and, more particularly, to a reinforced engine case.

BACKGROUND INFORMATION

A gas turbine engine includes various engine cases for housing internal components as well as performing other functionalities. Various types and configurations of engine cases are known in the art for a gas turbine engine. While these known engine cases have various benefits, there is still room in the art for improvement. There is a need in the art, for example, for a stiffener exhaust case for a gas turbine engine.

SUMMARY

According to an aspect of the present disclosure, an assembly is provided for a gas turbine engine. This engine assembly includes a bladed rotor rotatable about an axis, and an engine case. The engine case includes an outer duct wall, a first circumferential stiffener, a second circumferential stiffener and a plurality of axial stiffeners. The outer duct wall forms a shroud around the bladed rotor. The first circumferential stiffener extends circumferentially about the outer duct wall. The second circumferential stiffener extends circumferentially about the outer duct wall. The axial stiffeners are arranged circumferentially about the outer duct wall. Each of the axial stiffeners extends axially between the first circumferential stiffener and the second circumferential stiffener.

According to another aspect of the present disclosure, another assembly is provided for a gas turbine engine. This engine assembly includes an exhaust outer duct wall, a first circumferential stiffener, a second circumferential stiffener and a plurality of axial stiffeners. The exhaust outer duct wall extends circumferentially around and axially along an axis. The first circumferential stiffener projects radially out from and circumscribes the exhaust outer duct wall. The second circumferential stiffener projects radially out from and circumscribes the exhaust outer duct wall. The axial stiffeners are arranged circumferentially about the axis in an array. Each of the axial stiffeners projects radially out from the exhaust outer duct wall. Each of the axial stiffeners extends axially between the first circumferential stiffener and the second circumferential stiffener.

According to still another aspect of the present disclosure, another assembly is provided for a gas turbine engine. This engine assembly includes a turbine section, an exhaust section and an engine case. The engine case forms a peripheral boundary of an engine flowpath within at least one of the turbine section or the exhaust section. The engine case includes a first circumferential stiffener, a second circumferential and a plurality of axial stiffeners arranged in a circular array. Each of the axial stiffeners extends axially between and is formed integral with the first circumferential stiffener and the second circumferential stiffener.

The engine assembly may also include a plurality of turbine blades arranged in a circular array within the engine flowpath. The engine case may form a shroud around the turbine blades.

The engine assembly may also include a bladed turbine rotor rotatable about the axis. The exhaust outer duct wall may form a shroud around blade tips of the bladed turbine rotor.

The first circumferential stiffener, the second circumferential stiffener and the plurality of axial stiffeners may support a cantilevered axial end of the exhaust outer duct wall.

A gap may extend radially between the bladed rotor and the duct wall providing the bladed rotor with a rotor blade tip clearance.

The bladed rotor may be configured as or otherwise include a turbine rotor.

The engine case may be configured as or otherwise include an exhaust case.

The engine assembly may also include an inner duct wall and a plurality of vanes. The inner duct wall may extend circumferentially around the axis. The vanes may be arranged circumferentially about the axis. Each of the vanes may extend radially between and may be connected to the inner duct wall and the outer duct wall.

The engine assembly may also include a stator vane array. The stator vane array may include an inner platform, an outer platform and a plurality of turbine stator vanes. The outer platform may be axially adjacent and radially aligned with the outer duct wall. The turbine stator vanes may be arranged circumferentially about the axis and may extend radially out from the inner platform to the outer platform.

The first circumferential stiffener, the second circumferential stiffener and the axial stiffeners may project radially out from the outer duct wall.

The first circumferential stiffener, the second circumferential stiffener and the axial stiffeners may be formed integral with the outer duct wall.

The outer duct wall may extend axially along the axis to a case end. The first circumferential stiffener and the second circumferential stiffener may be axially spaced from the case end.

The engine case may also include a third circumferential stiffener extending circumferentially about the outer duct wall. The third circumferential stiffener may be disposed axially at the case end.

The outer duct wall may extend axially along the axis to a case end. The first circumferential stiffener may be disposed axially at the case end.

The engine case may also include a third circumferential stiffener and a plurality of second axial stiffeners. The third circumferential stiffener may extend circumferentially about the outer duct wall. The second axial stiffeners may be arranged circumferentially about the outer duct wall. Each of the second axial stiffeners may extend axially between the first circumferential stiffener and the third circumferential stiffener.

A first of the axial stiffeners may extend along a longitudinal centerline from the first circumferential stiffener to the second circumferential stiffener. At least a portion of the longitudinal centerline may be parallel with the axis.

The engine assembly may also include a second engine case circumscribing the engine case and axially overlapping the first circumferential stiffener. The engine case may be attached to the second engine case by a compliant coupling mounted to the outer duct wall adjacent the second circumferential stiffener.

The compliant coupling may be configured as or otherwise include a hairpin coupling.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
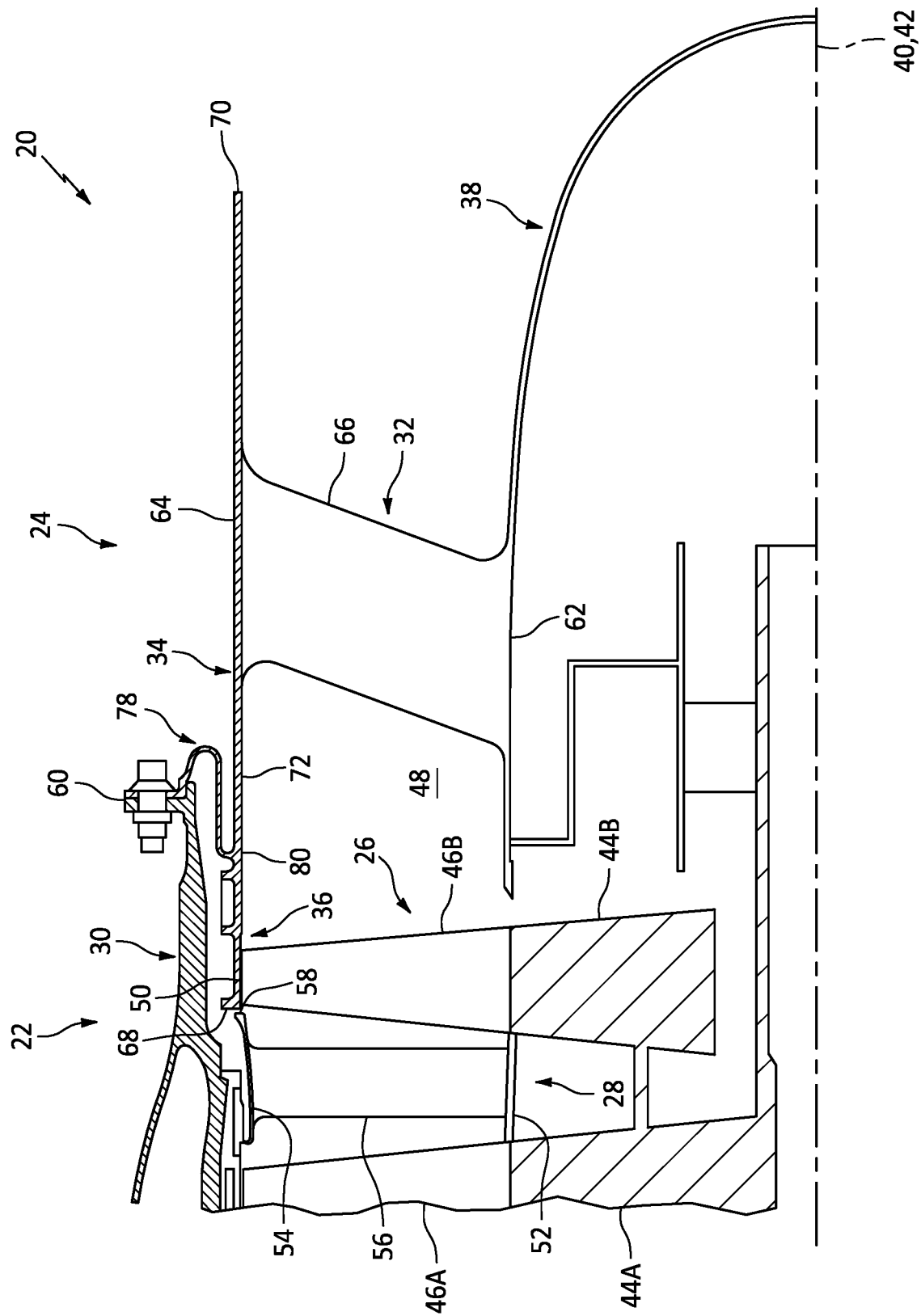
FIG. 1 is a partial schematic sectional illustration of a downstream, aft section of a gas turbine engine.

FIG. 1 partially illustrates a downstream, aft section of a gas turbine engine 20. This gas turbine engine 20 includes a turbine section 22 and an exhaust section 24. The turbine section 22 of FIG. 1 includes a turbine rotor 26, a turbine vane array 28 and a turbine case 30. The exhaust section 24 of FIG. 1 includes an exhaust vane array 32 and an exhaust case 34, which exhaust case 34 forms a shroud 36 for the turbine rotor 26 within the turbine section 22. The exhaust section 24 may also include a tail cone 38.

The turbine rotor 26 is a bladed rotor rotatable about a rotational axis 40, which rotational axis 40 may also be a centerline axis 42 of the gas turbine engine 20. The turbine rotor 26 includes one or more rotor disks 44 (e.g., 44A and 44B) and a plurality of rotor blades 46 (e.g., 46A and 46B; one blade visible per stage in FIG. 1); e.g., low pressure turbine (LPT) blades. The rotor blades 46A, 46B are arranged circumferentially around the rotor disk 44A, 44B and the axis 42 in a circular array. Each of the rotor blades 46A, 46B is connected to (e.g., formed integral with or otherwise attached to) the rotor disk 44A, 44B. The rotor blades 46A, 46B are arranged within a flowpath 48 (e.g., a core flowpath) of the gas turbine engine 20. Each of the rotor blades 46B projects radially out from the rotor disk 44B, within the engine flowpath 48, to an outer tip of the respective rotor blade 46B.

The turbine vane array 28 is disposed upstream of and axially neighbors (e.g., is axially adjacent) the turbine blades 46B. The turbine vane array 28 includes a turbine vane array inner platform 52, a turbine vane array outer platform 54 and a plurality of turbine vane array stator vanes 56.

The inner platform 52 extends axially along the axis 40, 42 between and to an upstream end of the inner platform 52 and a downstream end of the inner platform 52. The inner platform 52 extends circumferentially about (e.g., completely around) the axis 40, 42 thereby providing the inner platform 52 with, for example, a full-hoop tubular body. The inner platform 52 forms an inner peripheral boundary of the engine flowpath 48 through the turbine vane array 28.

The outer platform 54 extends axially along the axis 40, 42 between and to an upstream end of the outer platform 54 and a downstream end 58 of the outer platform 54. The outer platform 54 extends circumferentially about (e.g., completely around) the axis 40, 42 thereby providing the outer platform 54 with, for example, a full-hoop tubular body. The outer platform 54 is spaced radially outboard from the inner platform 52, and the outer platform 54 circumscribes the inner platform 52 and the stator vanes 56. The outer platform 54 forms an outer peripheral boundary of the engine flowpath 48 through the turbine vane array 28.

The stator vanes 56 are arranged circumferentially around the axis 40, 42 in a circulator array. Each of the stator vanes 56 extends radially across the engine flowpath 48 between the inner platform 52 and the outer platform 54. Each of the stator vanes 56 is connected to the inner platform 52 and the outer platform 54.

The turbine case 30 extends axially along the axis 40, 42 to a downstream, aft end of the turbine case 30. The turbine case 30 extends circumferentially about (e.g., completely around) the axis 40, 42 thereby providing the turbine case 30 with, for example, a full-hoop tubular body. The turbine case 30 houses (e.g., axially overlaps and circumscribes) the turbine vane array 28 and an upstream, forward portion of the exhaust case 34 and its shroud 36. The turbine case 30 may also provide a support structure for the turbine vane array 28. The outer platform 54, for example, may be mounted to and/or nested within the turbine case 30.

The exhaust vane array 32 is disposed downstream of and axially neighbors (e.g., is axially adjacent) the turbine rotor 26. The exhaust vane array 32 includes an exhaust vane array inner platform 62 (e.g., an inner duct wall), an exhaust vane array outer platform 64 (e.g., an outer duct wall) and a plurality of exhaust vane array stator vanes 66.

The inner platform 62 extends axially along the axis 40, 42 between and to an upstream end of the inner platform 62 and a downstream end of the inner platform 62, which inner platform downstream end may be axially abutted against an upstream end of the tail cone 38. The inner platform 62 extends circumferentially about (e.g., completely around) the axis 40, 42 thereby providing the inner platform 62 with, for example, a full-hoop tubular body. The inner platform 62 forms an inner peripheral boundary of the engine flowpath 48 through the exhaust vane array 32.

The outer platform 64 extends axially along the axis 40, 42 and is formed by an axially intermediate portion of the exhaust case 34. The outer platform 64 extends circumferentially about (e.g., completely around) the axis 40, 42 thereby providing the outer platform 64 with, for example, a full-hoop tubular body. The outer platform 64 is spaced radially outboard from the inner platform 62, and the outer platform 64 circumscribes the inner platform 62 and the stator vanes 66. The outer platform 64 forms an outer peripheral boundary of the engine flowpath 48 through the exhaust vane array 32.

The stator vanes 66 are arranged circumferentially around the axis 40, 42 in a circulator array. Each of the stator vanes 66 extends radially across the engine flowpath 48 between the inner platform 62 and the outer platform 64. Each of the stator vanes 66 is connected to the inner platform 62 and the outer platform 64.

Figure 2:
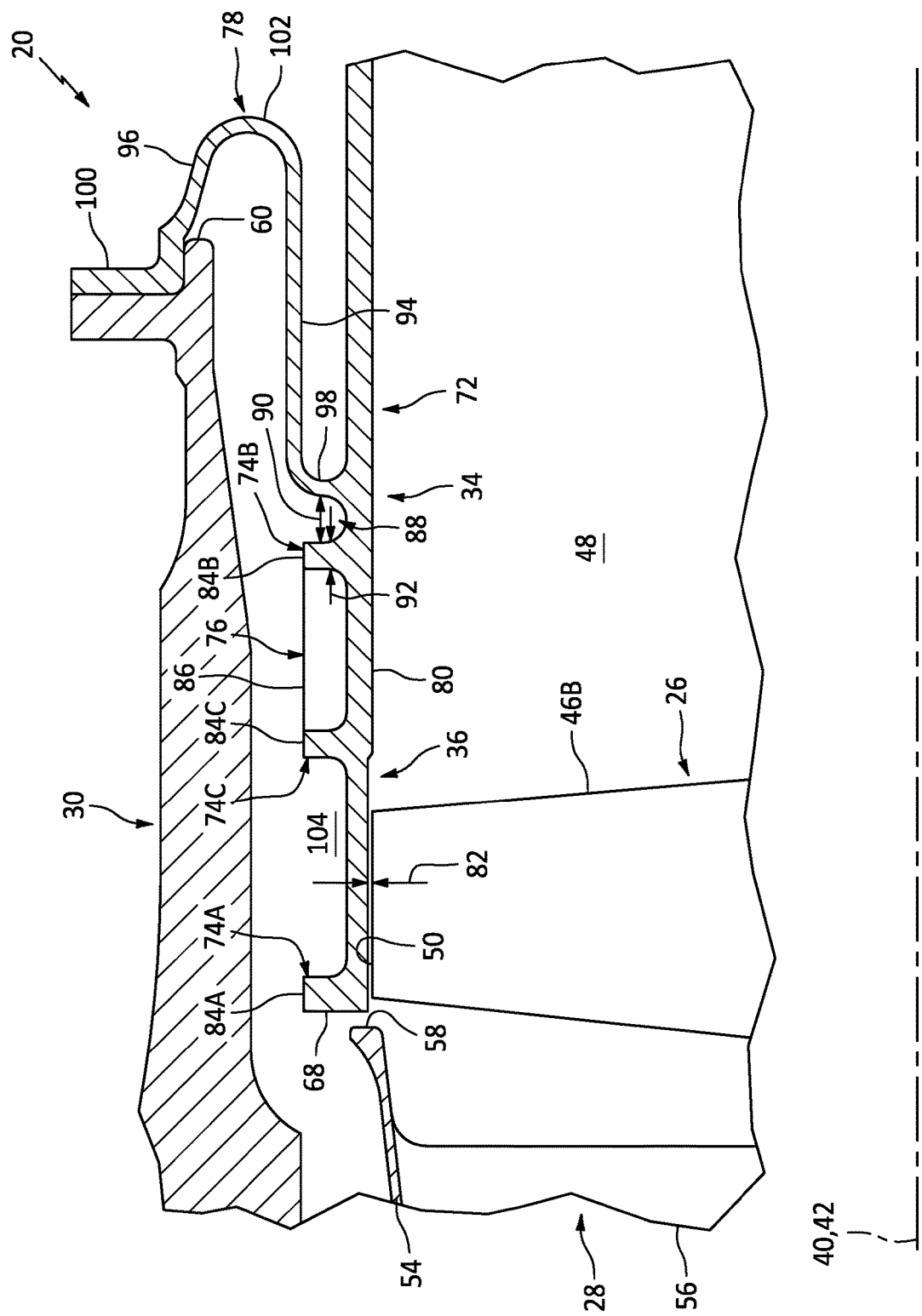
FIG. 2 is a partial sectional illustration of the gas turbine engine at an arrangement of stiffeners for an exhaust case.

The exhaust case 34 extends axially along the axis 40, 42 between and to an upstream end 68 of the exhaust case 34 and a downstream end 70 of the exhaust case 34. The exhaust case 34 houses (e.g., axially overlaps and circumscribes) the exhaust vane array 32 and the tail cone 38. Referring to FIG. 2, the forward portion of the exhaust case 34 also forms the shroud 36 for the turbine rotor 26.

Figure 3:
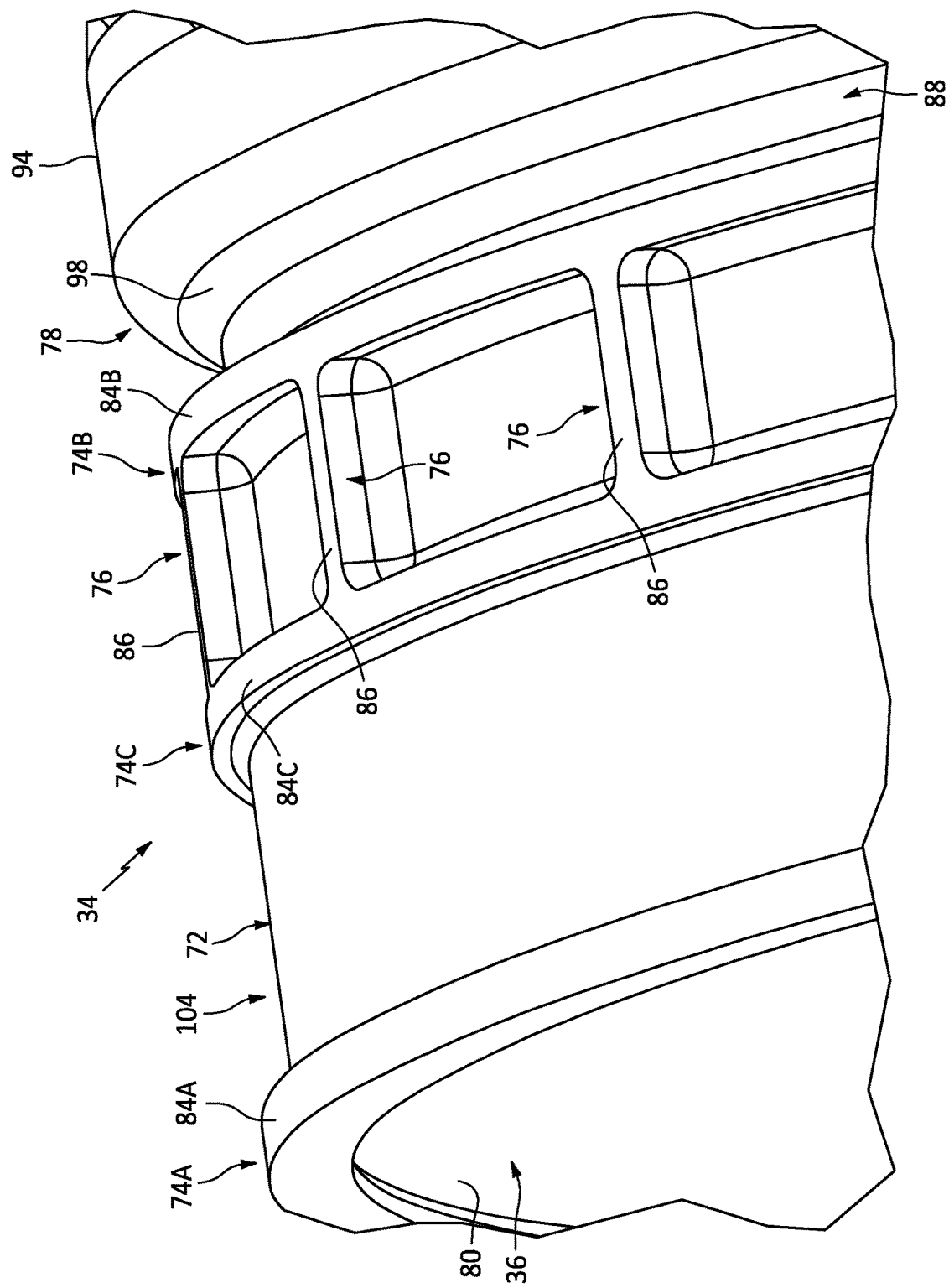
FIG. 3 is a partial perspective illustration of the exhaust case at the arrangement of stiffeners.

The exhaust case 34 of FIG. 2 includes an outer duct wall 72, a plurality of circumferential stiffeners 74 (e.g., 74A-C) and a plurality of axial stiffeners 76 (see also FIG. 3). The exhaust case 34 of FIG. 2 also includes a case mount 78 for attaching the exhaust case 34 and its duct wall 72 to the turbine case 30.

The duct wall 72 extends axially along the axis 40, 42 between and to the exhaust case upstream end 68 and the exhaust case downstream end 70 (see FIG. 1). The duct wall 72 extends circumferentially about (e.g., completely around) the axis 40, 42 thereby providing the exhaust case 34 and its duct wall 72 with, for example, a full-hoop tubular body. A portion of the duct wall 72 at (e.g., on, adjacent or proximate) the exhaust case upstream end 68 forms the shroud 36 around the turbine rotor 26 and its rotor blades 46B. More particularly, a radial inner surface 80 of the duct wall 72 at the exhaust case upstream end 68 forms an outer peripheral boundary of the engine flowpath 48 axially across at least a (e.g., final) downstream stage of the turbine rotor 26 and its rotor blades 46B. Briefly, referring to FIG. 1, the wall inner surface 80 may also form the outer peripheral boundary of the engine flowpath 48 axially along the rest of the exhaust case 34 and its duct wall 72; see FIG. 1. Referring again to FIG. 2, at the exhaust case upstream end 68, the duct wall 72 may be radially aligned with and axially next to the outer platform 54 and its outer platform downstream end 58. The duct wall 72 and its wall inner surface 80 are spaced radially outward from the turbine rotor 26 and its blade tips 50 by a gap providing the turbine rotor 26 and its rotor blades 46B with a rotor blade tip clearance 82.

The circumferential stiffeners 74A-C are arranged axially along the duct wall 72 and the axis 40, 42 between the exhaust case upstream end 68 and the case mount 78. The upstream circumferential stiffener 74A, for example, is located axially at the exhaust case upstream end 68. The downstream circumferential stiffener 74B is located axially at (e.g., spaced slightly axially upstream from) the case mount 78. The intermediate circumferential stiffener 74C is located axially between the upstream circumferential stiffener 74A and the downstream circumferential stiffener 74B. Each of these circumferential stiffeners 74 may be configured as an annular rib. Each of the circumferential stiffeners 74, for example, is connected to (e.g., formed integral with) the duct wall 72. Each of the circumferential stiffeners 74 projects radially out from the duct wall 72 to a distal end 84 (e.g., 84A-C) of the respective circumferential stiffener 74. Each of the circumferential stiffeners 74 extends circumferentially about (e.g., completely around, circumscribing) the duct wall 72. The circumferential stiffeners 74 may thereby increase a hoop strength of the duct wall 72.

Referring to FIG. 3, the axial stiffeners 76 are arranged circumferentially about the duct wall 72 and the axis 40, 42 in a (e.g., circumferentially evenly spaced) circular array. This array of the axial stiffeners 76 is located axially between the intermediate circumferential stiffener 74C and the downstream circumferential stiffener 74B. Each of the axial stiffeners 76 may be configured as an elongated rib. Each of the axial stiffeners 76, for example, is connected to (e.g., formed integral with) the duct wall 72. Each of the axial stiffeners 76 projects radially out from the duct wall 72 to a distal end 86 of the respective axial stiffener 76. Each of the axial stiffeners 76 extends axially along the axis 40, 42 between and to the intermediate circumferential stiffener 74C and the downstream circumferential stiffener 74B. Each of the axial stiffeners 76 may also be connected to (e.g., formed integral with) the intermediate circumferential stiffener 74C and the downstream circumferential stiffener 74B. The axial stiffeners 76 may thereby increase an axial stiffness of the duct wall 72 and its cantilevered portion axially extending from the case mount 78 to the exhaust case upstream end 68. By increasing axial stiffness of the duct wall 72, the axial stiffeners 76 of FIG. 2 may facilitate provision of a relatively tight (e.g., small) rotor blade tip clearance 82 without chance (or with significantly reduced likelihood) of the blade tips 50 contacting the wall inner surface 80 and rubbing against the duct wall 72/the shroud 36.

The case mount 78 is connected to (e.g., formed integral with or otherwise attached to) the duct wall 72. The case mount 78 is spaced axially downstream, aft of the downstream circumferential stiffener 74B by an annular channel 88. This channel 88 extends axially within the exhaust case 34 between and to the downstream circumferential stiffener 74B and the case mount 78. The channel 88 projects radially into the exhaust case 34 to the duct wall 72. The channel 88 extends circumferentially about (e.g., completely around) the duct wall 72 within the exhaust case 34. An axial width 90 of the channel 88 may be between one time (1×) and five times (5×) an axial width 92 of the downstream circumferential stiffener 74B. The present disclosure, however, is not limited to such an exemplary dimensional relationship. For example, in other embodiments, the channel axial width 90 may be greater than five times (5×) the stiffener axial width 92. In still other embodiments, the channel 88 may be omitted and the downstream circumferential stiffener 74B and the case mount 78 may be integrated together.

The case mount 78 may be configured as a compliant coupling such as, but not limited to, a hairpin coupling. The case mount 78 of FIG. 2, for example, includes an inner leg 94 and an outer leg 96. This case mount 78 also includes an inner mount 98, an outer mount 100 and a (e.g., curved) intermediate leg 102. The inner leg 94 extends axially along the axis 40, 42 between and to an upstream end of the inner leg 94 and a downstream end of the inner leg 94. The inner leg upstream end is connected to the duct wall 72 by the inner mount 98. The outer leg 96 extends axially along the axis 40, 42 between and to an upstream end of the outer leg 96 and a downstream end of the outer leg 96. The outer leg upstream end is connected to the outer mount 100 (e.g., a mounting flange), which outer mount 100 may be attached (e.g., mechanically fastened) to the turbine case 30 at its turbine case downstream end 60. The inner leg downstream end and the outer leg downstream end are connected to one another through the intermediate leg 102. The inner leg 94, the outer leg 96 and the intermediate leg 102 are arranged together to provide the case mount 78 with a spring resilience for accommodating various thermal, stress and/or dynamic loads imparted during gas turbine engine operation.

In some embodiments, referring to FIG. 3, an annular channel 104 may be formed by and axially between the upstream circumferential stiffener 74A and the intermediate circumferential stiffener 74C. This channel 104 extends axially within the exhaust case 34 between and to the upstream circumferential stiffener 74A and the intermediate circumferential stiffener 74C. The channel 104 projects radially into the exhaust case 34 to the duct wall 72. The channel 104 extends circumferentially about (e.g., completely around) the duct wall 72 within the exhaust case 34.

Figure 4:
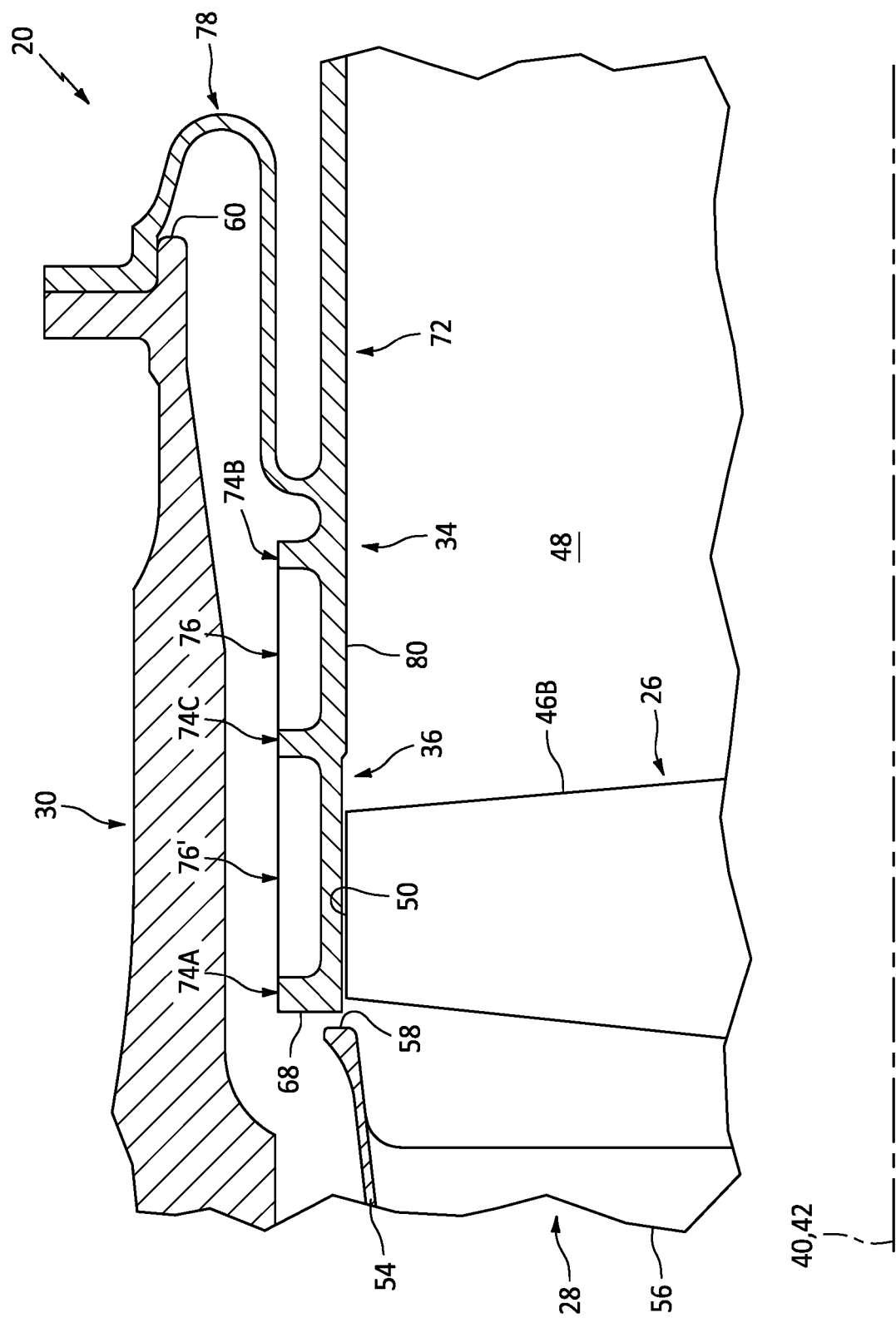
FIGS. 4-6 are partial sectional illustrations of the gas turbine engine at various other arrangements of stiffeners for the exhaust case.

In some embodiments, referring to FIG. 4, the exhaust case 34 may include a plurality of upstream axial stiffeners 76' in addition (or alternatively) to the downstream axial stiffeners 76. These upstream axial stiffeners 76' are arranged circumferentially about the duct wall 72 and the axis 40, 42 in a (e.g., circumferentially evenly spaced) circular array. This array of the upstream axial stiffeners 76' is located axially between the intermediate circumferential stiffener 74C and the upstream circumferential stiffener 74A. Each of the upstream axial stiffeners 76' may be configured as an elongated rib. Each of the upstream axial stiffeners 76', for example, is connected to (e.g., formed integral with) the duct wall 72. Each of the upstream axial stiffeners 76' projects radially out from the duct wall 72 to a distal end of the respective upstream axial stiffener 76'. Each of the upstream axial stiffeners 76' extends axially along the axis 40, 42 between and to the intermediate circumferential stiffener 74C and the upstream circumferential stiffener 74A. Each of the upstream axial stiffeners 76' may also be connected to (e.g., formed integral with) the intermediate circumferential stiffener 74C and the upstream circumferential stiffener 74A. The upstream axial stiffeners 76' may thereby further increase the axial stiffness of the duct wall 72 and its cantilevered portion axially extending from the case mount 78 to the exhaust case upstream end 68.

Figure 5:
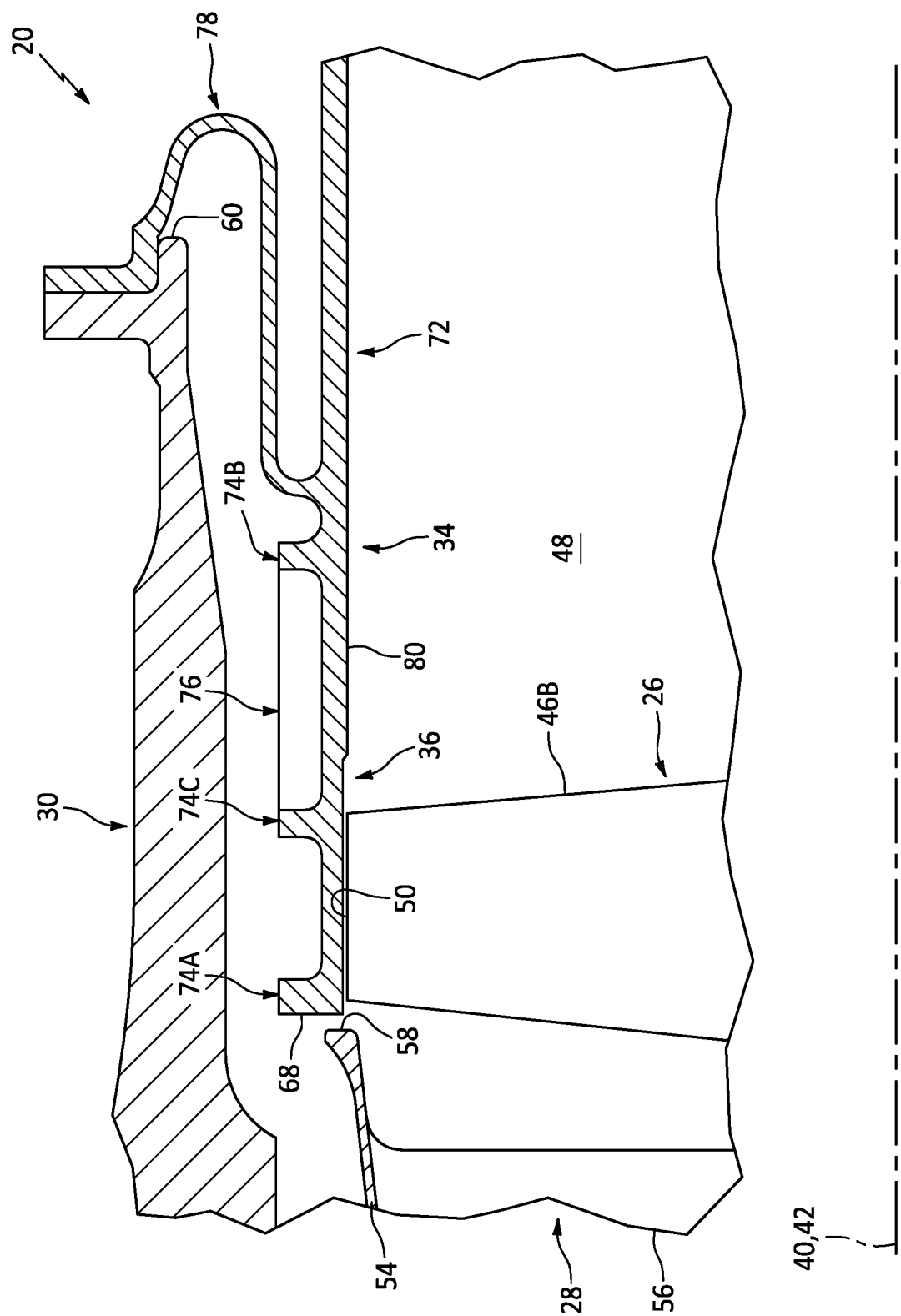
Figure 6:
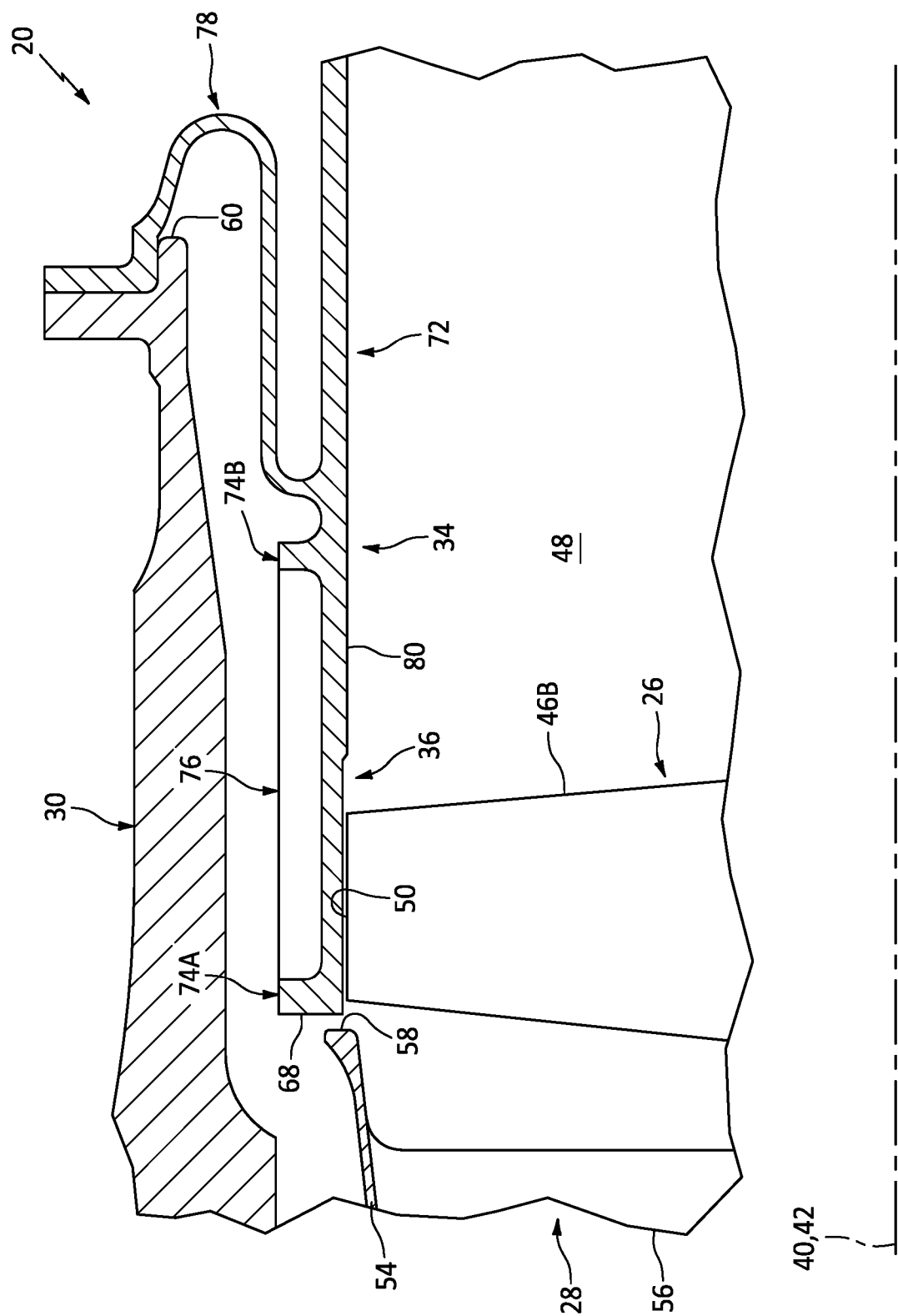

In some embodiments, referring to FIG. 2, the intermediate circumferential stiffener 74C may be located axially downstream of the blade tips 50. In other embodiments, referring to FIG. 5, the intermediate circumferential stiffener 74C may axially overlap/be axially aligned with the blade tips 50. In still other embodiments, referring to FIG. 6, the intermediate circumferential stiffener 74C may be omitted.

Figure 7:
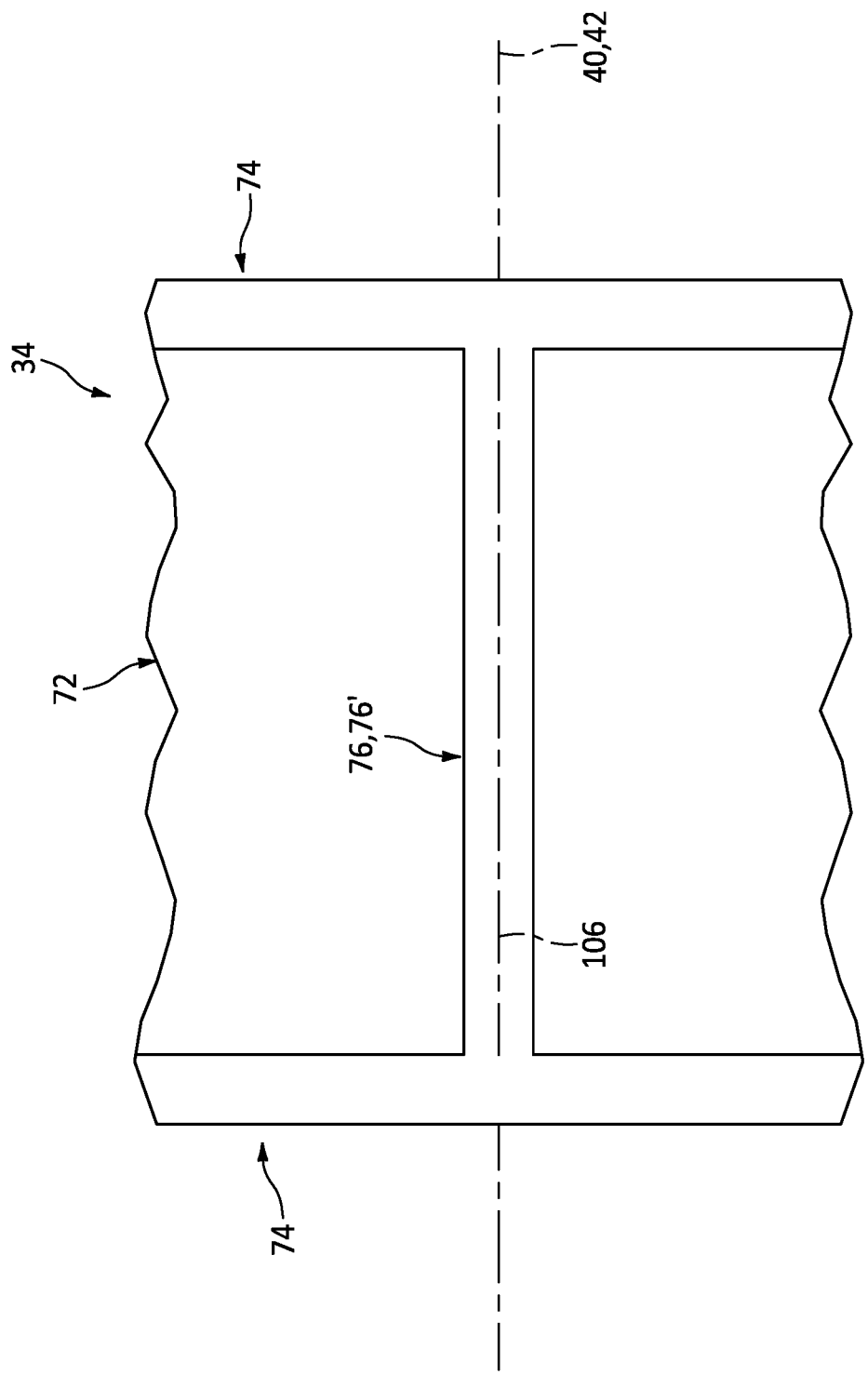
FIG. 7 is a partial illustration of the arrangement of stiffeners.

In some embodiments, referring to FIG. 7, each axial stiffener 76, 76' may extend along a longitudinal centerline 106 axially between the respective circumferential stiffeners 76, 76'. At least a portion or an entirety of this longitudinal centerline 106 may be a straight centerline. At least a portion or the entirety of the longitudinal centerline 106 may also or alternatively be substantially parallel with the axis 40, 42. The present disclosure, however, is not limited to such an exemplary straight and/or parallel arrangement.

Figure 8:
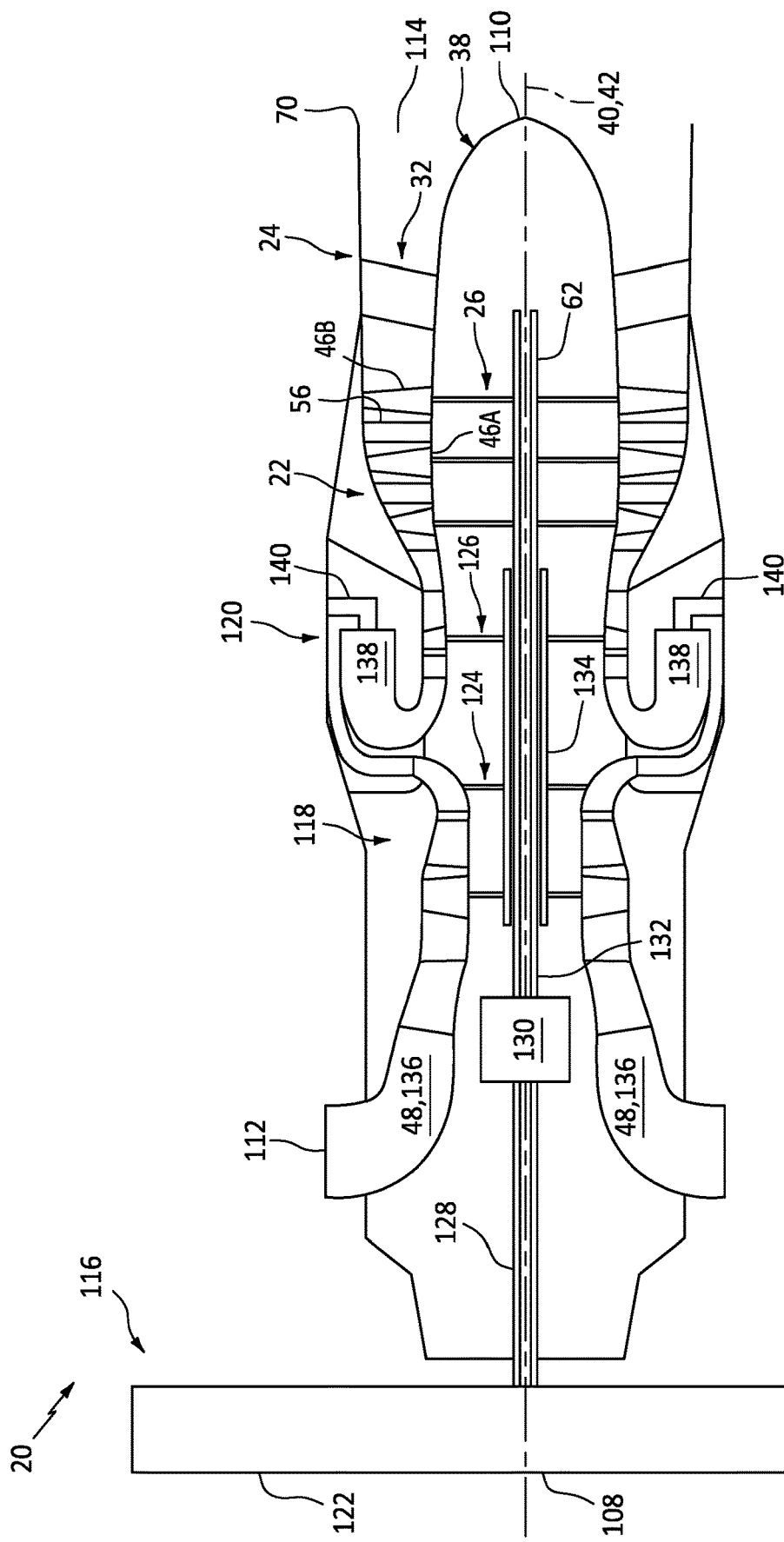
FIG. 8 is a schematic illustration of a turboprop gas turbine engine.

FIG. 8 illustrates an example of the gas turbine engine 20. This gas turbine engine is configured as a turboprop gas turbine engine for an aircraft. This gas turbine engine 20 of FIG. 8 extends axially along the centerline axis 42 between a forward end 108 of the gas turbine engine 20 and an aft end 110 of the gas turbine engine 20. The gas turbine engine 20 of FIG. 8 includes an upstream airflow inlet 112, a downstream combustion products exhaust 114, a propulsor (e.g., a propeller) section 116, a compressor section 118, a combustor section 120, the turbine section 22 and the exhaust section 24.

The propulsor section 116 includes a bladed propulsor rotor 122; e.g., a propeller rotor. The compressor section 118 includes a bladed compressor rotor 124. The turbine section 22 include a bladed high pressure turbine (HPT) rotor 126 and the bladed low pressure turbine (LPT) rotor 26, where the LPT rotor 26 is configured as a power turbine rotor. Each of the engine rotors 122, 124, 126 includes a plurality of rotor blades arranged circumferentially around and connected to one or more respective rotor disks.

The propulsor rotor 122 of FIG. 8 is connected to the LPT rotor 26 sequentially through, for example, a propulsor shaft 128, a geartrain 130 (e.g., a transmission) and a low speed shaft 132. The compressor rotor 124 of FIG. 8 is connected to the HPT rotor 126 through a high speed shaft 134. This high speed shaft 134 may be parallel with and circumscribe the low speed shaft 132.

During operation, air enters the gas turbine engine 20 through the airflow inlet 112. This air is directed into a core flowpath 136; e.g., the engine flowpath 48 of FIG. 1. The core flowpath 136 extends from the airflow inlet 112, sequentially through the compressor section 118, the combustor section 120, the turbine section 22 and the exhaust section 24, to the combustion products exhaust 114. The air entering the core flowpath 136 may be referred to as "core air". This core air is compressed by the compressor rotor 124 and directed into a combustion chamber 138 of a combustor in the combustor section 120. Fuel is injected into the combustion chamber 138 by one or more fuel injectors 140 and mixed with the compressed core air to provide a fuel-air mixture. This fuel-air mixture is ignited and combustion products thereof flow through and sequentially cause the HPT rotor 126 and the LPT rotor 26 to rotate. The rotation of the HPT rotor 126 drives rotation of the compressor rotor 124 and, thus, compression of air received from the airflow inlet 112. The rotation of the LPT rotor 26 drives rotation of the propulsor rotor 122, which propulsor rotor 122 of FIG. 8 propels air outside of and along the gas turbine engine 20 to provide forward engine thrust.

The terms "upstream", "downstream", "forward" and "aft" are used to orientate the components of the gas turbine engine 20 described above relative to the axis 40, 42 and a direction of flow through the engine flowpath 48/the core flowpath 136. A person of skill in the art will recognize, however, one or more of these components may be utilized in other orientations than those described above, for example, when the gas turbine engine 20 is configured as a reverse flow turboprop gas turbine engine. Furthermore, while the bladed rotor 26, the duct wall 72 and its shroud 36 are described above with respect to the turbine section 22 and the exhaust section 24, the present disclosure is not limited to placement in such specific engine sections.

The bladed rotor 26, the duct wall 72 and its shroud 36 may be included in various gas turbine engines other than the one described above. The bladed rotor 26, the duct wall 72 and its shroud 36, for example, may be included in a geared gas turbine engine where a gear train connects one or more shafts to one or more rotors in a fan section, a compressor section and/or any other engine section. Alternatively, the bladed rotor 26, the duct wall 72 and its shroud 36 may be included in a gas turbine engine configured without a gear train. The bladed rotor 26, the duct wall 72 and its shroud 36 may be included in a gas turbine engine configured with a single spool or with multiple spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
   a bladed rotor rotatable about an axis; and
   an engine case including an outer duct wall, a first circumferential stiffener, a second circumferential stiffener and a plurality of axial stiffeners, the outer duct wall forming a shroud around the bladed rotor, the first circumferential stiffener extending circumferentially about the outer duct wall, the second circumferential stiffener extending circumferentially about the outer duct wall, the plurality of axial stiffeners arranged circumferentially about the outer duct wall, and each of the plurality of axial stiffeners extending axially between the first circumferential stiffener and the second circumferential stiffener.

2. The assembly of claim 1, wherein a gap extends radially between the bladed rotor and the duct wall providing the bladed rotor with a rotor blade tip clearance.

3. The assembly of claim 1, wherein the bladed rotor comprises a turbine rotor.

4. The assembly of claim 1, wherein the engine case comprises an exhaust case.

5. The assembly of claim 1, further comprising:
an inner duct wall extending circumferentially around the axis; and
a plurality of vanes arranged circumferentially about the axis, each of the plurality of vanes extending radially between and connected to the inner duct wall and the outer duct wall.

6. The assembly of claim 1, further comprising:
a stator vane array including an inner platform, an outer platform and a plurality of turbine stator vanes;
the outer platform axially adjacent and radially aligned with the outer duct wall; and
the plurality of turbine stator vanes arranged circumferentially about the axis and extending radially out from the inner platform to the outer platform.

7. The assembly of claim 1, wherein the first circumferential stiffener, the second circumferential stiffener and the plurality of axial stiffeners project radially out from the outer duct wall.

8. The assembly of claim 1, wherein the first circumferential stiffener, the second circumferential stiffener and the plurality of axial stiffeners are formed integral with the outer duct wall.

9. The assembly of claim 1, wherein
the outer duct wall extends axially along the axis to a case end; and
the first circumferential stiffener and the second circumferential stiffener are axially spaced from the case end.

10. The assembly of claim 9, wherein
the engine case further includes a third circumferential stiffener extending circumferentially about the outer duct wall; and
the third circumferential stiffener is disposed axially at the case end.

11. The assembly of claim 1, wherein
the outer duct wall extends axially along the axis to a case end; and
the first circumferential stiffener is disposed axially at the case end.

12. The assembly of claim 1, wherein the engine case further includes
a third circumferential stiffener extending circumferentially about the outer duct wall; and
a plurality of second axial stiffeners arranged circumferentially about the outer duct wall, and each of the plurality of second axial stiffeners extending axially between the first circumferential stiffener and the third circumferential stiffener.

13. The assembly of claim 1, wherein
a first of the plurality of axial stiffeners extends along a longitudinal centerline from the first circumferential stiffener to the second circumferential stiffener; and
at least a portion of the longitudinal centerline is parallel with the axis.

14. The assembly of claim 1, further comprising:
a second engine case circumscribing the engine case and axially overlapping the first circumferential stiffener;
the engine case attached to the second engine case by a compliant coupling mounted to the outer duct wall adjacent the second circumferential stiffener.

15. The assembly of claim 14, wherein the compliant coupling comprises a hairpin coupling.

16. An assembly for a gas turbine engine, comprising:
an exhaust outer duct wall extending circumferentially around and axially along an axis;
a first circumferential stiffener projecting radially out from and circumscribing the exhaust outer duct wall;
a second circumferential stiffener projecting radially out from and circumscribing the exhaust outer duct wall; and
a plurality of axial stiffeners arranged circumferentially about the axis in an array, each of the plurality of axial stiffeners projecting radially out from the exhaust outer duct wall, and each of the plurality of axial stiffeners extending axially between the first circumferential stiffener and the second circumferential stiffener.

17. The assembly of claim 16, further comprising:
a bladed turbine rotor rotatable about the axis;
the exhaust outer duct wall forming a shroud around blade tips of the bladed turbine rotor.

18. The assembly of claim 16, wherein the first circumferential stiffener, the second circumferential stiffener and the plurality of axial stiffeners support a cantilevered axial end of the exhaust outer duct wall.

19. An assembly for a gas turbine engine, comprising:
a turbine section;
an exhaust section; and
an engine case forming a peripheral boundary of an engine flowpath within at least one of the turbine section or the exhaust section, the engine case comprising a first circumferential stiffener, a second circumferential and a plurality of axial stiffeners arranged in a circular array, each of the plurality of axial stiffeners extending axially between and formed integral with the first circumferential stiffener and the second circumferential stiffener.

20. The assembly of claim 19, further comprising:
a plurality of turbine blades arranged in a circular array within the engine flowpath;
the engine case forming a shroud around the plurality of turbine blades.

\* \* \* \* \*